Oct. 15, 1963  W. H. RUDDER  3,106,952
TIRE BEAD GROMMET
Filed Oct. 23, 1961

INVENTOR.
WALTER H. RUDDER
BY
*J.B. Holden*
ATTORNEY

3,106,952
TIRE BEAD GROMMET
Walter H. Rudder, Akron, Ohio, assignor to The Goodyear Tire & Rubber Company, Akron, Ohio, a corporation of Ohio
Filed Oct. 23, 1961, Ser. No. 146,996
5 Claims. (Cl. 152—362)

This invention relates to improvements in the construction of pneumatic tires and, more particularly, to improvements in the bead ring or grommet structures for such tires.

In the construction of pneumatic tire casings having inextensible beads therein, it is customary to form such beads of a plurality of coiled loops of steel wire or other similar inextensible material. The loops are formed from either a single continuous wire which is embedded in a rubber compound, or a plurality of parallel wires embedded in rubber and commonly referred to as a wire tape. In either case, the grommet is formed by winding the continuous wire or tape a plurality of times with the ends thereof overlapping and bound by a small strip of friction tape, or by staples. The grommet is then usually wrapped with rubberized fabric and a filler or apex strip of rubber compound is usually applied to the radially outer side of the grommet prior to application of the flipper strip.

When tire casings having coiled wire therein are cured, the pressure required in the mold during the curing operation changes the original cross-sectional shape of the coiled bead. If the bead is formed of coiled wire tape, it is initially formed in substantially rectangular cross-sectional shape but the curing pressure changes it into an approximate oval shape. In prior bead constructions, the individual wires during this shaping operation are free to move and the bead wires do not move to form a uniformly concentric disposition of the wires. Certain portions of some or all of the wires become spaced apart a greater distance axially or radially than in other portions of the wires, and the endings of the wires, for example, become distorted and drift up into the flex area of the sidewall and may cause tire failures.

It is an object of this invention to provide a bead grommet structure which holds the wires of the grommet in a compact bundle, while at the same time permits the wires to shift position axially relative to each other, and permits the rubber insulation surrounding the wire to flow into any void areas existing in the apex area above the bead during the shaping operation.

A further object of the invention is to provide a novel cover for an inextensible bead core which will effectively hold the wires into a compact bundle and which permits the flow of rubber insulation surrounding the bead wires into the apex area of the tire during shaping of the tire in the mold.

The foregoing and other advantages of the invention will become apparent from the following description taken in connection with the accompanying drawings, wherein.

Figure 1:
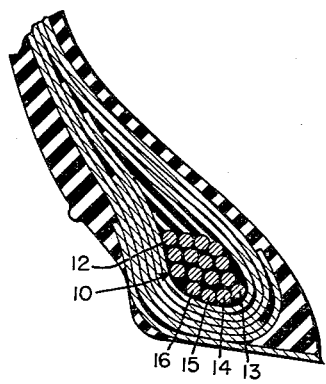
FIG. 1 is a cross-sectional view of the bead area of a cured tire incorporating the bead grommet of this invention.
Figure 2:
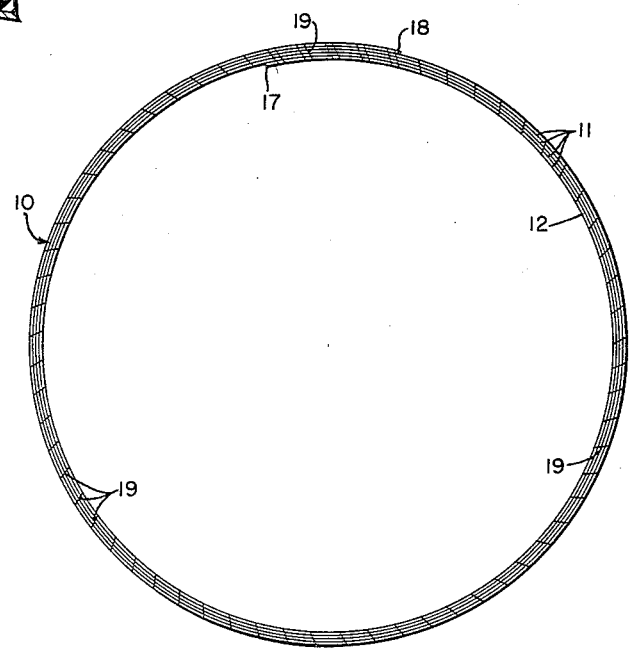
FIG. 2 is a side elevational view of a bead grommet made according to this invention.
Figure 3:
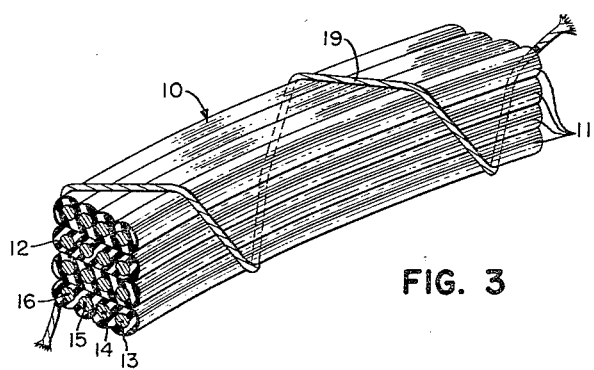
FIG. 3 is an enlarged partial isometric view of the bead core of this invention.

Referring to the drawings, the invention will be described and shown in the accompanying drawings with respect to a bead ring, core, or grommet made of a wire tape but it is to be understood that the invention is equally applicable to a grommet made from a rubber coated single continuous wire. Numeral 10 refers generally to the bead ring, core, or grommet consisting of a plurality of turns or convolutions 11 of a wire tape 12 having a plurality of wires 13, 14, 15, and 16 extending in parallel direction and embedded in rubber. The tape is wound upon itself in a plurality of convolutions in a conventional manner on well-known bead core winding machines. The radially inner end 17 of the tape is overlapped by the radially outer end 18 of the tape for a distance of several inches.

After the winding operation of the tape 11, a narrow elongated element or strand 19 is then spirally turned or wrapped around the cross-section of the coiled tape 12 with the circumferential distance between each turn being from one-fourth to two inches and with the pitch of the spiral turn being substantially greater than the width of the element 19. Preferably, the element 19 is turned twice around the portion of the grommet containing the overlapping ends 17 and 18. The winding of the element 19 is started adjacent the ending 18, extends completely across the overlapped portion of the tape ending and the circumference of the bead core and terminates adjacent the ending 17 to provide a double wrap of the element 19 in the spliced area of the bead.

In accordance with the invention, the element 19 consists of a textile heat-shrinkable material, such as a high-polymeric synthetic organic material which has the property of high shrinkage at elevated temperatures existing during the vulcanization of the tire. Nylon and a material which has been referred to commercially as "teralon" are preferred materials. The element 19 may comprise a twisted cord similar to that used as the reinforcing cords in the tire, or a bundle of continuous filaments having very little, if any, twist, or a plurality of yarns or cords of very small denier twisted together sufficiently to hold them into a compact bundle. An element 19 made of nylon tire cord constructed of two plies of 840 denier yarns has been found to be suitable for the purposes of this invention.

During the shaping operation of the green tire, and cure of the tire in the mold, element 19 holds the wires 13 through 16 of each convolution of the tape 12 in a compact bundle while at the same time permits the wires to shift relative to each other. The double winding of the element 19 in the overlapped area of the endings 17 and 18 of the tape prevent any wire ending from drifting radially of the bead grommet. In accordance with this invention, as the nylon cord or element 19 is heated during the vulcanization operation, the high polymeric textile material shrinks, or tends to contract longitudinally, and bind the bead wires into a strong unitary structure. At the same time the external pressure from the mold and bag causes the rubber insulation existing around the wires to exude outwardly between the turns of the element 19 into the apex area of the tire and fill any voids therein.

While certain representative embodiments and details have been shown for the purpose of illustrating the invention, it will be apparent to those skilled in this art that various changes and modifications may be made therein without departing from the spirit or scope of the invention.

What is claimed is:

1. A bead grommet for pneumatic tires comprising a plurality of loops of metallic wire embedded in rubber forming an endless ring, said ring having a narrow elongated element made of continuous filament, heat-shrinkable, synthetic polymeric material which is spirally wrapped in a plurality of widely spaced turns around the cross-section of the ring for the complete circumferential extent thereof.

2. A bead grommet for pneumatic tires as claimed in claim 1 in which the wire forming said endless ring includes overlapping wire ends and said spirally turned element has a greater number of turns at the overlapped portion of said wire ends than at the remaining portion thereof.

3. A bead grommet for pneumatic tires comprising a plurality of loops of metallic wire embedded in rubber forming an endless ring, said ring having a narrow elongated element made of a heat-shrinkable, synthetic polymeric material, spirally wrapped in a plurality of turns around the cross-section of the wire ring for the complete circumferential extent of said ring, each of said spiral turns being spaced circumferentially of the ring a distance substantially greater than the width of said element.

4. A bead grommet as claimed in claim 3 in which the circumferential distance between said spiral turns is less than 2 inches.

5. A bead grommet for pneumatic tires comprising a plurality of loops of metallic wire embedded in rubber forming an endless ring, said ring including overlapping wire ends, a narrow elongated element made of continuous filament, heat-shrinkable, synthetic polymeric material turned around the cross-section of the ring for the complete circumferential extent thereof, each of said spiral turns being spaced circumferentially of the ring a distance susbtantially greater than the width of said element, said spirally turned element being turned a greater number of times at the overlapped portion of said wire ends than at the remaining portion thereof.

References Cited in the file of this patent

UNITED STATES PATENTS

| | | |
|---|---|---|
| 1,763,179 | Pierce | June 10, 1930 |
| 2,081,096 | Reed | May 18, 1937 |